(12) United States Patent
Kojima et al.

(10) Patent No.: US 9,897,137 B2
(45) Date of Patent: Feb. 20, 2018

(54) BEARING DEVICE AND ROTARY MACHINE

(71) Applicant: MITSUBISHI HEAVY INDUSTRIES, LTD., Tokyo (JP)

(72) Inventors: Yuya Kojima, Tokyo (JP); Tadasuke Nishioka, Tokyo (JP); Takaya Futae, Tokyo (JP); Motoki Ebisu, Tokyo (JP); Takashi Nambu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/329,424

(22) PCT Filed: Aug. 28, 2014

(86) PCT No.: PCT/JP2014/072562
§ 371 (c)(1),
(2) Date: Jan. 26, 2017

(87) PCT Pub. No.: WO2016/031013
PCT Pub. Date: Mar. 3, 2016

(65) Prior Publication Data
US 2017/0211616 A1 Jul. 27, 2017

(51) Int. Cl.
*F16C 17/10* (2006.01)
*F16C 33/10* (2006.01)
(Continued)

(52) U.S. Cl.
CPC .............. *F16C 17/10* (2013.01); *F16C 33/10* (2013.01); *F01D 25/16* (2013.01); *F02B 37/00* (2013.01);
(Continued)

(58) Field of Classification Search
CPC ....... F16C 17/10; F16C 33/10; F16C 2360/24
See application file for complete search history.

(56) References Cited

U.S. PATENT DOCUMENTS 4,640,630 A * 2/1987 Yoshioka .............. F01D 25/164
384/129
4,902,144 A 2/1990 Thoren
(Continued)

FOREIGN PATENT DOCUMENTS

CH       407665 A     2/1966
DE    2061393 A1     6/1972
(Continued)

OTHER PUBLICATIONS

International Search Report and Written Opinion of the International Searching Authority (Forms PCT/ISA/237 and PCT/ISA/210), for International Application No. PCT/JP2014/072562, dated Dec. 9, 2014, with an English translation thereof.

*Primary Examiner* — Thomas R Hannon
(74) *Attorney, Agent, or Firm* — Birch, Stewart, Kolasch & Birch, LLP

(57) ABSTRACT

A rotary machine is provided with: a flange section protruding in the radial direction of a rotating shaft which rotates about an axis and rotating together with the rotating shaft; a stationary bush disposed at a distance in the direction of the axis from the flange section, surrounding the outer peripheral surface of the rotating shaft, and provided in a housing supporting the rotating shaft so as to be immovable in the direction of the axis relative to the rotating shaft; and a rotation bush which is disposed between the flange section and the stationary bush so as to be sandwiched there between in the direction of the axis, covers the outer peripheral surface of the rotating shaft, and is rotatable relative to the rotating shaft and the housing while floating in fluid. The rotation bush has, on the surface thereof which faces the direction of the axis, a land surface and a tapered surface which is continuous with the land surface.

20 Claims, 5 Drawing Sheets

(51) Int. Cl.
*F02B 37/00* (2006.01)
*F04D 29/056* (2006.01)
*F01D 25/16* (2006.01)

(52) U.S. Cl.
CPC ........ *F04D 29/056* (2013.01); *F05D 2220/40* (2013.01); *F16C 2360/24* (2013.01)

(56) References Cited

U.S. PATENT DOCUMENTS

| | | | |
|---|---|---|---|
| 6,709,160 B1* | 3/2004 | Ward | F01D 25/166 |
| | | | 384/286 |
| 7,793,499 B2* | 9/2010 | Gutknecht | F01D 25/166 |
| | | | 184/6.11 |
| 8,021,105 B2 | 9/2011 | Ammann et al. | |
| 9,677,603 B2* | 6/2017 | Kleinschmidt | F16C 35/10 |
| 2010/0192571 A1* | 8/2010 | Boning | F01D 25/186 |
| | | | 60/605.3 |
| 2014/0119898 A1* | 5/2014 | Nishida | F02M 55/00 |
| | | | 415/170.1 |
| 2017/0045084 A1* | 2/2017 | Uneura | F16C 35/02 |

FOREIGN PATENT DOCUMENTS

| | | | |
|---|---|---|---|
| EP | 2042753 | A1 | 4/2009 |
| JP | 54-167209 | U | 11/1979 |
| JP | 56-6917 | A | 1/1981 |
| JP | 56-12125 | U | 2/1981 |
| JP | 58-123919 | U | 8/1983 |
| JP | 60-18614 | A | 1/1985 |
| JP | 2000-87753 | A | 3/2000 |
| JP | 2003-222123 | A | 8/2003 |
| JP | 2006-77803 | A | 3/2006 |
| JP | 2010-540857 | A | 12/2010 |
| JP | 4800788 | A | 12/2010 |
| JP | 2011-127428 | A | 6/2011 |
| JP | 2013-2559 | A | 1/2013 |
| SG | 183771 | A1 | 9/2012 |

* cited by examiner

BEARING DEVICE AND ROTARY MACHINE

TECHNICAL FIELD

The present invention relates to a bearing device and a rotary machine having the same.

BACKGROUND ART

In worldwide efforts to preserve a global environment, for example, regulations with respect to exhaust gas and fuel consumption in an internal combustion engine such as an engine of an automobile are further enhanced. Since a turbocharger feeds compressed air to an engine, in the turbocharger, it is possible to further decrease a volume displacement compared to natural intake. Accordingly, the turbocharger is a device which is remarkably effective to improve the fuel consumption and to decrease $CO_2$.

In the turbocharger, since a turbine is rotated by exhaust gas of an engine, a delivery fan of a centrifugal compressor coaxially positioned with the turbine is rotated. Air which is compressed by the rotation of the delivery fan is decelerated by a diffuser, the pressure of the air is increased, and the air is supplied to an engine via a scroll flow path. A method for driving the turbocharger is not limited to the aspect in which the turbocharger is driven by exhaust gas. For example, various aspects such as an aspect in which the turbocharger is driven by an electric motor or an aspect in which the turbocharger is driven by a motor via a transmission are known.

The turbocharger includes a rotating shaft which connects a drive portion and the delivery fan of the centrifugal compressor to each other, and for example, a sliding bearing is used as a bearing of the rotating shaft and is used to be lubricated by a fluid. A bearing is configured of a radial bearing (journal bearing) which receives a radial load and a thrust bearing which receives a thrust load.

In the turbocharger, since regulation with respect to flue gas and a high-speed rotation for achieving a high output are required, a load to the rotating shaft is likely to increase. In addition, in the turbocharger which is driven by the exhaust gas, if an exhaust press increases, the load to rotating shaft is likely to increase. According to the increase of the load with respect to the rotating shaft, a friction loss when the rotating shaft rotates increases, a bearing loss increases, and there is a problem that performance of the turbocharger decreases.

Here, PTL 1 discloses a structure which has a so-called a floating disk which freely floats between a non-rotation type bearing housing which accommodates a shaft inside the bearing housing and a bearing comb which integrally rotates with the rotating shaft in a fluid type thrust bearing (axial bearing) of a rotatable rotating shaft. A relative speed difference in a fluid generated between the bearing housing and the bearing comb is decreased by the floating disk, shearing stress decreases, a friction resistance decreases, and a friction loss decreases.

CITATION LIST

Patent Literature

[PTL1] PCT Japanese Translation Patent Publication No. 2010-540857

SUMMARY OF INVENTION

Technical Problem

However, in the technology disclosed in PTL 1, the friction loss is decreased by only the thrust bearing. Accordingly, there is a problem that the bearing loss of the entire rotating shaft (shaft) including the journal bearing (sliding bearing receiving the radial load) is not sufficiently decreased.

The present invention provides a bearing device in which the bearing loss of the entire rotating shaft generated by the rotation of the rotating shaft can be decreased, and a rotary machine having the same.

Solution to Problem

According to a first aspect of the present invention, there is provided a bearing device, including: a flange section which protrudes in a radial direction of a rotating shaft rotating about an axis and rotates along with the rotating shaft; a stationary bush which is disposed at a distance in the direction of the axis from the flange section, surrounds an outer peripheral surface of the rotating shaft, and is provided in a housing supporting the rotating shaft so as to be immovable in the direction of the axis relative to the rotating shaft; and a rotation bush which is disposed between the flange section and the stationary bush so as to be interposed between the flange section and the stationary bush in the direction of the axis, surrounds the outer peripheral surface of the rotating shaft, and is rotatable relative to the rotating shaft and the housing while floating in a fluid, in which the rotation bush includes a land surface which is formed on a surface in the direction of the axis facing each of the flange section and the stationary bush along a surface in the direction of the axis in the flange section and the stationary bush, and a tapered surface which is continuous with the land surface and is inclined such that a gap between the tapered surface and the flange section and a gap between the tapered surface and the stationary bush increase in the direction of the axis toward a direction opposite to a rotation direction of the rotating shaft.

According to this configuration, the rotation bush plays a role as a so-called floating disk which surrounds the rotating shaft and floats in the fluid, the surface of the rotation bush facing the inside in the radial direction functions as a journal pad surface, and it is possible to receive a load in the radial direction from the rotating shaft by the fluid between the inner peripheral surface of the rotation bush and the outer peripheral surface of the rotating shaft.

In addition, the rotation bush is interposed between the flange section and the stationary bush, floats in the fluid, and is disposed so as to be rotatable relative to the rotating shaft and the housing. Accordingly, the surface of the rotation bush in the direction of the axis function as a thrust pad surface facing the surface in the direction of the axis in the flange section and the stationary bush, and the rotation bush can receive the load in the thrust direction.

In addition, as effects of the rotation bush having the function as the floating disk, since the rotation bush is rotated according to the rotating shaft, velocity gradients of the fluid between the rotating shaft and the rotation bush and between the flange section and the rotation bush decrease. As a result, it is possible to decrease a friction loss generated due to shearing stress.

In addition, the fluid, which floats the rotation bush and has a flow velocity in the rotation direction generated due to the rotations of the rotating shaft and the rotation bush, reaches the land surface over the tapered surface. Since the distance (gap) between the flange section and the stationary bush on the land surface is smaller than the distance between the flange section and the stationary bush on the tapered surface, the tapered space is formed between the flange section and the stationary bush, and a wedge film pressure and a throttle film pressure are generated in the fluid on the land surface. According to the pressures in the fluid, the stationary bush and the rotation bush do not come into direct contact with each other, the flange section and the rotation bush do not come into direct contact with each other, and it is possible to improve bearing performance which receives the load in the thrust direction generated in the rotating shaft which is rotated.

In addition, in the bearing device according to a second aspect of the present invention, in the first aspect, the stationary bush may be a member which is separated from the housing, and a stationary bush fixing portion which fixes the stationary bush and the housing may be further provided.

Accordingly, the shape of the housing is simplified, and the housing is easily manufactured. In addition, a force such as a load or friction is applied to the stationary bush and the stationary bush is easily abraded and deteriorates. Accordingly, if the stationary bush is formed of a separate component when maintenance, inspection, repair, or replacement is performed, the inspection or replacement is easily performed.

Moreover, in the bearing device according to a third aspect of the present invention, in the second aspect, the stationary bush fixing portion may be a pin which is fitted into a hole portion which penetrates the housing and the stationary bush.

Since the pin is used in the stationary bush fixing portion, it is possible to easily fix the stationary bush to the housing.

In the bearing device according to a fourth aspect of the present invention, in the third aspect, a discharging hole through which the fluid is discharged may be formed in the stationary bush fixing portion to penetrate the stationary bush fixing portion in the radial direction.

Since the discharging hole is provided, the fluid, which floats the rotation bush, flowing into a portion between the outer peripheral surface of the rotating shaft surround by the stationary bush and the inner peripheral surface of the stationary bush is discharged to the outside in the radial direction, a contaminated unnecessary fluid is discharged, and it is possible to decrease an agitation loss or a friction loss when the rotating shaft rotates. In addition, since the discharging hole is formed in the stationary bush fixing portion, it is possible to easily form the discharging hole. Moreover, in a case where disadvantages such as clogging of the discharging hole occur, inspection and replacement are easily performed by removing only the stationary bush fixing portion.

Moreover, in the bearing device according to a fifth aspect of the present invention, in the second aspect, the stationary bush fixing portion may be a support member which is interposed between the housing and the stationary bush, regulates the movement of the stationary bush in the direction of the axis, and allows the movement of the stationary bush in the radial direction.

The stationary bush moves in the radial direction following vibrations of the rotating shaft. However, since the support member is used as the stationary bush fixing portion, the movement of the stationary bush in the radial direction can be allowed, and it is possible to prevent the stationary bush from coming into partial contact with the rotating shaft.

Moreover, since the movement of the stationary bush in the direction of the axis is regulated, the function of the stationary bush as the bearing device in the thrust direction is secured.

Moreover, in the bearing device according to a sixth aspect of the present invention, in the fifth aspect, the stationary bush fixing portion may be an elastic body.

Accordingly, the stationary bush follows the shaft vibrations, and it possible to prevent the stationary bush from coming into partial contact with the rotating shaft. In addition, an operation which returns the rotating shaft to the original position (an initial position in a state where the shaft vibrations are not applied) is performed due to an elastic force of the elastic body.

In the bearing device according to a seventh aspect of the present invention, in any one of the first to sixth aspects, a discharging hole through which the fluid is discharged may be formed in the stationary bush to penetrate the stationary bush in the radial direction.

Accordingly, the fluid, which floats the rotation bush, flowing into a portion between the outer peripheral surface of the rotating shaft surround by the stationary bush and the inner peripheral surface of the stationary bush is discharged to the outside in the radial direction, a contaminated unnecessary fluid is discharged, and it is possible to decrease an agitation loss or a friction loss when the rotating shaft rotates.

In the bearing device according to an eighth aspect of the present invention, in any one of the first to seventh aspects, a distance between the outer peripheral surface of the rotating shaft and the inner peripheral surface of the stationary bush facing the outer peripheral surface in the radial direction may be greater than a distance between the outer peripheral surface of the rotating shaft and the inner peripheral surface of the rotation bush facing the outer peripheral surface in the radial direction.

The distance between the inner peripheral surface of the stationary bush and the outer peripheral surface of the rotating shaft which rotates so as to face the inner peripheral surface increases, and a velocity gradient in the radial direction of the fluid, which floats the rotation bush, flowing into a portion between the inner peripheral surface of the stationary bush and the outer peripheral surface of the rotating shaft is gentle, it is possible to decrease shearing stress of the fluid, and it is possible to decrease a rotation loss.

In the bearing device according to a ninth aspect of the present invention, in the eighth aspect, a diameter of a portion of the rotating shaft corresponding to a region in which the stationary bush is disposed in the direction of the axis may decrease.

Accordingly, the distance between the inner peripheral surface of the stationary bush and the outer peripheral surface of the rotating shaft which rotates so as to face the inner peripheral surface increases, and a velocity gradient in the radial direction of the fluid, which floats the rotation bush, flowing into a portion between the inner peripheral surface of the stationary bush and the outer peripheral surface of the rotating shaft is gentle. Accordingly, it is possible to decrease shearing stress of the fluid, and it is possible to decrease a rotation loss. In addition, since the diameter of the rotating shaft is decreased, it is possible to decrease moment of inertia of the rotating shaft, and it is possible to improve rotation efficiency of the rotating shaft.

In the bearing device according to a tenth aspect of the present invention, in the eighth aspect, in the stationary bush, a recessed portion which is recessed from the inside in the radial direction toward the outside may be formed on the inner peripheral surface facing the outer peripheral surface of the rotating shaft in the peripheral direction of the rotating shaft, and a distance between a bottom surface of the recessed portion and the outer peripheral surface of the rotating shaft facing the bottom surface may be greater than a distance between the outer peripheral surface of the rotating shaft and the inner peripheral surface of the rotation bush facing the outer peripheral surface.

A distance between the bottom surface of the recessed portion and the rotating shaft in the radial direction is greater than a distance between the rotation bush and the rotating shaft in the radial direction. Accordingly, it is possible to decrease shearing stress of the fluid, which floats the rotation bush, flowing into a portion between the inner peripheral surface of the stationary bush and the outer peripheral surface of the rotating shaft which rotates to face the inner peripheral surface, and it is possible to decrease the rotation loss.

According to an eleventh aspect, there is provided a rotary machine including: the bearing device according to any one of the first to tenth aspects; and the rotating shaft which is supported by the bearing device.

Advantageous Effects of Invention

According to the above-described bearing device and rotary machine, since the rotation bush receives the load of the rotating shaft from both directions such as the thrust direction and the radial direction, it is possible to decrease the bearing loss of the entire rotating shaft generated due to the rotation of the rotating shaft.

DESCRIPTION OF EMBODIMENTS

First Embodiment

Hereinafter, a turbocharger 1 (rotary machine) according an embodiment of the present invention will be described in detail with reference to the drawings.

Figure 1:
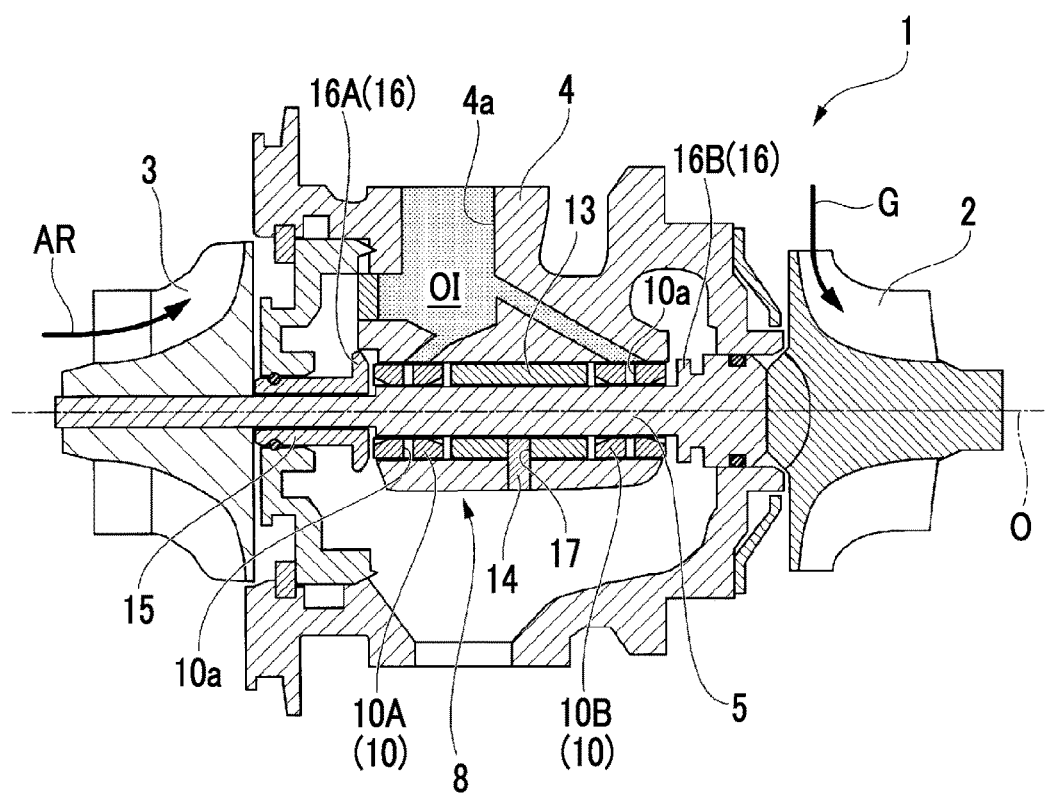
FIG. 1 is an entire side view of a turbocharger according to a first embodiment of the present invention.
Figure 2A:
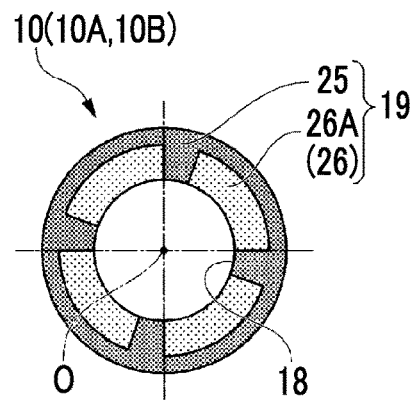
FIG. 2A is a view showing a rotation bush in the turbocharger according to the first embodiment of the present invention and is a view showing a surface in a direction of an axis facing a flange section.
Figure 2B:
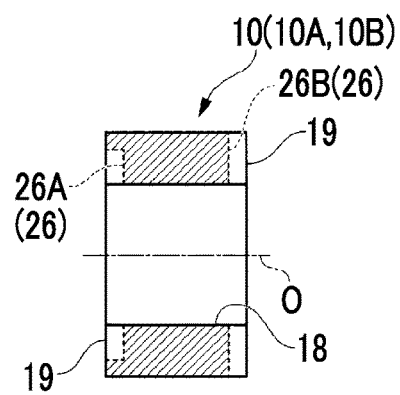
FIG. 2B is a view showing the rotation bush in the turbocharger according to the first embodiment of the present invention and is a view showing a cross section including the axis.
Figure 2C:
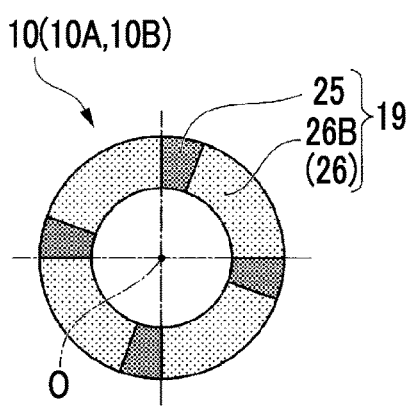
FIG. 2C is a view showing the rotation bush in the turbocharger according to the first embodiment of the present invention and is a view showing a surface in the direction of the axis facing a stationary bush.
Figure 3:
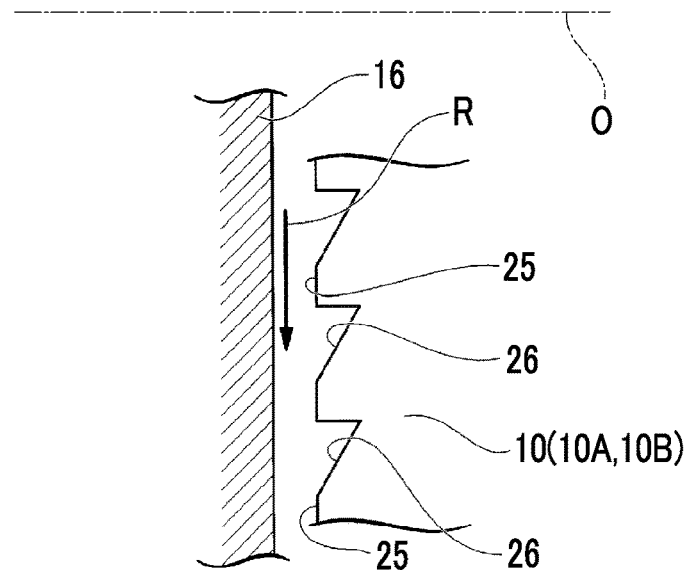
FIG. 3 is a main portion enlarged view in the sectional view including the axis of the rotation bush in the turbocharger according to the first embodiment of the present invention.

As shown in FIG. 1, the turbocharger 1 includes a rotating shaft 5 which is rotatable, an exhaust turbine 2 and a compressor 3 which rotate along with the rotating shaft 5, a housing 4 which covers the rotating shaft 5, and a bearing device 8 which is provided in the housing 4 and supports the rotating shaft 5.

In the turbocharger 1, the exhaust turbine 2 is rotated by exhaust gas G from an engine (not shown) and supplies air AR compressed by the compressor 3 according to the rotation to the engine.

The rotating shaft 5 is rotatable about the axis O.

The exhaust turbine 2 and the compressor 3 are integrally connected to the rotating shaft 5, the exhaust turbine 2 is disposed on one end of the rotating shaft 5, and the compressor 3 is disposed on the other end of the rotating shaft 5.

The housing 4 covers the rotating shaft 5 from the outer periphery side between the exhaust turbine 2 and the compressor 3 such that the rotating shaft 5 is accommodated inside the housing 4, and supports the rotating shaft 5.

The bearing device 8 is a so-called fluid type sliding bearing. The bearing device 8 includes a flange section 16, a rotation bush 10, and a stationary bush 13 which are disposed around the rotating shaft 5 between the exhaust turbine 2 and the compressor 3.

A fluid (here, lubricating oil OI) exist around the rotating shaft 5 and the bearing device 8. The lubricating oil OI is supplied from the outside of the housing 4 to the vicinity of the bearing device 8 inside the housing 4 via an oil supply flow path 4a which is formed in the housing 4 and is open to the outer peripheral side of the rotating shaft 5.

Two flange sections such as a first flange section 16A and a second flange section 16B are provided as the flange section 16.

The first flange section 16A is formed on a tubular sleeve 15, which is externally fitted to the rotating shaft 5 so as to be fixed, on the compressor 3 side between the compressor 3 and the exhaust turbine 2, and annularly protrudes from the rotating shaft 5 on the outside in the radial direction of the rotating shaft 5. Here, the first flange section 16A may be directly formed on the rotating shaft 5.

The second flange section 16B is integrally formed with the rotating shaft 5 on the exhaust turbine 2 side between the compressor 3 and the exhaust turbine 2 so as to annularly protrude from the rotating shaft 5 on the outside in the radial direction of the rotating shaft 5. Here, similarly to the first flange section 16A, the second flange section 16B may be formed on a tubular sleeve which is externally fitted to the rotating shaft 5.

The stationary bush 13 is disposed at a distance in the direction of the axis O from the flange section 16. That is, the stationary bush 13 is disposed so as to be interposed between the first flange section 16A and the second flange section 16B. The stationary bush 13 surrounds the outer peripheral surface of the rotating shaft 5 and is provided in the housing 4 so as to be immovable in the direction of the axis O relative to the rotating shaft 5.

More specifically, the stationary bush 13 is a tubular member which is formed to surround the outer peripheral surface of the rotating shaft 5. In addition, the lubricating oil OI exists between the outer peripheral surface of the rotating shaft 5 and the inner peripheral surface of the stationary bush 13. In a state where the operation of the turbocharger 1 is stopped, the rotating shaft 5 and the stationary bush 13 are held in a state where the rotating shaft 5 and the stationary bush 13 do not come into contact with each other.

In the present embodiment, the stationary bush 13 is a member which is separated from the housing 4. The outer peripheral surface of the stationary bush 13 is in contact with the housing 4, and a stationary bush fixing portion 14 which is a pin or a fixing screw is provided so as to be fitted (or inserted) into a hole portion 17 which is formed to penetrate the entire region of the housing 4 and the stationary bush 13 in the radial direction from the housing 4 side to the stationary bush 13. In this way, the housing 4 and the stationary bush 13 are fixed to each other by the stationary bush fixing portion 14.

In the present embodiment, the stationary bush fixing portion 14 is provided at the center position of the stationary bush 13 in the direction of the axis O.

Here, the stationary bush fixing portion 14 may not be provided, and the stationary bush 13 may be integrally formed with the housing 4.

Two bushes such as a first rotation bush 10A and a second rotation bush 10B are provided as the rotation bush 10.

The first rotation bush 10A is disposed on the side opposite to compressor 3 in the direction of the axis O with respect to the first flange section 16A and is disposed on the compressor 3 side in the direction of the axis O with respect to the stationary bush 13. That is, the first rotation bush 10A is disposed between the first flange section 16 and the stationary bush 13 so as to be interposed therebetween in the direction of the axis O.

The first rotation bush 10A is a tubular member which is formed so as to surround the outer peripheral surface of the rotating shaft 5, one surface of the first rotation bush 10A in the direction of the axis O faces the surface of the flange section 16 in the direction of the axis O. In addition, the other surface of the first rotation bush 10A in the direction of the axis O faces the surface of the stationary bush 13 in the direction of the axis O.

The lubricating oil OI exists between the outer peripheral surface of the rotating shaft 5 and the inner peripheral surface of the first rotation bush 10A, between the first rotation bush 10A and the stationary bush 13, and between the first rotation bush 10A and the first flange section 16A so as to form oil films. The rotating shaft 5 and the rotation bush 10 are in no contact with each other, and the rotation bush 10 floats in the lubricating oil OI to freely move.

In the first rotation bush 10A, an oil supply hole 10a which penetrates in the radial direction and communicates with the oil supply flow path 4a of the housing 4.

In this way, the inner peripheral surface of the rotation bush 10 functions as a journal pad surface 18 which receives a journal load of the rotating shaft 5. In addition, each of the surfaces in the direction of the axis O facing the first flange section 16A and the stationary bush 13 functions as a thrust pad surface 19 which receives a thrust load.

The second rotation bush 10B has the configuration similar to that of the first rotation bush 10A and receives the journal load and the thrust load of the rotating shaft 5. The second rotation bush 10B is disposed on the side opposite to the first rotation bush 10A in the direction of the axis O with respect to the stationary bush 13. More specifically, the second rotation bush 10B is disposed on the side opposite to the exhaust turbine 2 in the direction of the axis O with respect to the second flange section 16B, and is disposed on the exhaust turbine 2 side in the direction of the axis O with respect to the stationary bush 13. Accordingly, the second rotation bush 10B is disposed between the second flange section 16B and the stationary bush 13 so as to be interposed therebetween in the direction of the axis O.

If positional relationships of components in the bearing device 8 are arranged, the first flange section 16A and the second flange section 16B are disposed at a distance from each other in the direction of the axis O, and the stationary bush 13 is disposed between the first flange section 16A and the second flange section 16B. In addition, the first rotation bush 10A is disposed between the first flange section 16 and the stationary bush 13, and the second rotation bush 10B is disposed between the second flange section 16B and the stationary bush 13.

Here, the rotation bush 10 will be described in detail with reference to FIGS. 2A, 2B, 2C, and 3.

The rotation bush 10 includes a land surface 25 and a tapered surface 26 on the thrust pad surface 19 which is a surface in the direction of the axis O facing each of the flange section 16 and the stationary bush 13.

The land surface 25 is a surface which is along the surface in the direction of the axis O in the flange section 16 and the stationary bush 13, and is a surface which spreads in the radial direction of the rotating shaft 5. The land surface 25 may not be completely parallel to the surface in the direction of the axis O in the flange section 16 and the stationary bush 13.

The tapered surface 26 is a surface which is continuous with the land surface 25 and is inclined so as to be separated from the flange section 16 (or the stationary bush 13) in the direction of the axis O toward the direction opposite to a rotation direction R of the rotating shaft 5. That is, the tapered surface 26 is inclined such that a gap between the tapered surface 26 and the flange section 16 and a gap between the tapered surface 26 and the stationary bush 13 increase in the direction of the axis O toward the direction opposite to the rotation direction R of the rotating shaft 5.

Since the land surface 25 and the tapered surface 26 are alternately provided in the peripheral direction of the rotating shaft 5, the thrust pad surface 19 of the rotation bush 10 is formed in an uneven shape in the direction of the axis O. In addition, a gap between the land surface 25 and the flange section 16 (or the stationary bush 13) is small, and a gap between the tapered surface 26 and the flange section 16 (or the stationary bush 13) is large.

Here, in the present embodiment, a tapered surface 26A (26) formed on the thrust pad surface 19 facing the flange section 16 is formed at a position close to the inside in the radial direction on the thrust pad surface 19. That is, the tapered surface 26A is formed in a region between an end edge on the inside in the radial direction of the thrust pad surface 19 and the intermediate position in the radial direction.

Meanwhile, the tapered surface 26B (26) formed on the thrust pad surface 19 facing the stationary bush 13 is formed over the entire region between the end edge on the inside in the radial direction on the thrust pad surface 19 and the end edge on the outside in the radial direction.

In this way, the area of the tapered surface 26B is larger than the area of the tapered surface 26A. In other words, the ratio of the area of the tapered surface 26 with respect to the area of the land surface 25 on the stationary bush 13 side is larger than that on the flange section 16 side.

Here, the tapered surface 26A and the tapered surface 26B may be formed such that the areas thereof are the same as each other.

In addition, the land surface 25 and the tapered surface 26 may not be formed on both sides of the surface (thrust pad surface 19) of the rotation bush 10 in the direction of the axis O. That is, the land surface 25 and the tapered surface 26 may be formed on only the thrust pad surface 19 on one side in the direction of the axis O.

In addition, the land surface 25 and the tapered surface 26 may be formed on only the first rotation bush 10A (or the second rotation bush 10B).

According to the turbocharger 1, the rotation bush 10 in the bearing device 8 plays the role as a so-called floating disk which surrounds the rotating shaft 5 and floats in the lubricating oil OI. In addition, it is possible to receive a load in a radial direction generated in the rotating shaft using the oil film between the inner peripheral surface of the rotation bush 10 and the outer peripheral surface of the rotating shaft 5.

In addition, since the rotation bush 10 is disposed between the flange section 16 and the stationary bush 13, the rotation bush 10 can receive a load in the thrust direction.

In addition, as effects of the rotation bush 10 having the function as the floating disk, since the rotation bush 10 is rotated according to the rotating shaft 5 and is relatively rotated with respect to the rotating shaft 5, velocity gradients of the lubricating oil OI between the rotating shaft 5 and the rotation bush 10 and between the flange section 16 and the rotation bush 10 decrease. As a result, it is possible to decrease a friction loss generated due to shearing stress.

In addition, since the stationary bush 13 is a member which is separated from the housing 4, the shape of the housing 4 is simplified, and the housing 4 is easily manufactured. In addition, a force such as a load or friction is applied to the stationary bush 13 and the stationary bush 13 is easily abraded and deteriorates. Accordingly, if the stationary bush 13 is formed of a separate component when maintenance, inspection, repair, or replacement is performed, the inspection or replacement is easily performed.

In addition, the lubricating oil OI having a flow velocity in the rotation direction R due to the rotations of the rotating shaft 5 and the rotation bush 10 reaches the land surface 25 over the tapered surface 26.

The distances between the land surface 25, and the flange section 16 and the stationary bush 13 are narrower than the distances between tapered surface 26, and the flange section 16 and the stationary bush 13. Accordingly, a tapered space is formed between the flange section 16 and the stationary bush 13, and a wedge film pressure and a throttle film pressure are generated in the lubricating oil OI on the land surface 25.

According to the pressures, the stationary bush 13 and the rotation bush 10 do not come into direct contact with each other, the flange section 16 and the rotation bush 10 do not come into direct contact with each other, and it is possible to improve bearing performance which receives the load of the rotating shaft 5 in the thrust direction.

In addition, in the thrust pad surface 19 in the rotation bush 10, the area of the tapered surface 26 on the stationary bush 13 side is larger than the area of the tapered surface 26 on the flange section 16 side. Accordingly, the pressure generated between the stationary bush 13 and the tapered surface 26B is larger than the pressure between the flange section 16 and the tapered surface 26A, and it is possible to prevent the stationary bush 13 and the tapered surface 26B from coming into contact with each other.

According to the turbocharger 1 of the present embodiment, since the rotation bush 10 in the bearing device 8 receives the loads of the rotating shaft 5 in both directions such as the thrust direction and the radial direction, it is possible to decrease the entire bearing loss of the rotating shaft 5 generated by the rotation of the rotating shaft 5.

Second Embodiment

Figure 4:
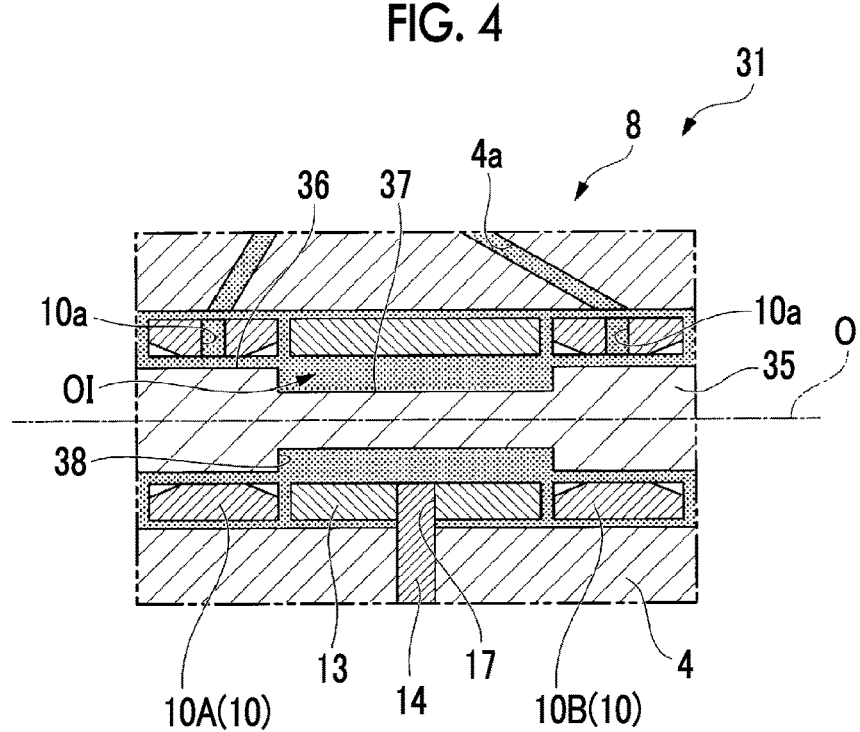
FIG. 4 is a sectional view including an axis of a bearing device in a turbocharger according to a second embodiment of the present invention.

Hereinafter, a turbocharger 31 (rotary machine) of a second embodiment of the present invention will be described with reference to FIG. 4.

The same reference numerals are assigned to the components similar to those of the first embodiment, and detailed descriptions thereof are omitted.

In the present embodiment, a shape of a rotating shaft 35 is different from that of the first embodiment.

The diameter of the rotating shaft 35 is decreased in a portion corresponding to a region in the direction of the axis O in which the stationary bush 13 is disposed. That is, a distance in the radial direction between the outer peripheral surface of the rotating shaft 35 and the inner peripheral surface of the stationary bush 13 facing the outer peripheral surface is greater than a distance in the radial direction between the outer peripheral surface of the rotating shaft and the inner peripheral surface of the rotation bush 10 facing the outer peripheral surface. Accordingly, a gap between the stationary bush 13 and the rotating shaft 35 increases.

More specifically, the rotating shaft 35 includes a large-diameter outer peripheral surface 36 which is formed at the position facing the rotation bush 10 in the radial direction, a small-diameter outer peripheral surface 37 which is formed to have a smaller diameter than the diameter of the large-diameter outer peripheral surface 36 at the position facing the stationary bush 13 in the radial direction, and a stepped surface 38 which connects the large-diameter outer peripheral surface 36 and the small-diameter outer peripheral surface 37 to each other and faces in the direction of axis O.

According to the turbocharger 31 of the present embodiment, the distance between the inner peripheral surface of the stationary bush 13 and the outer peripheral surface of the rotating shaft 35 which rotates so as to face the inner peripheral surface increases. Accordingly, a velocity gradient in the radial direction of the oil film of the lubricating oil OI flowing into a portion between the inner peripheral surface of the stationary bush 13 and the outer peripheral surface of the rotating shaft 35 is gentle, it is possible to decrease shearing stress of the lubricating oil OI, and it is possible to decrease a rotation loss of the bearing device 8.

In addition, since the diameter of a portion of the rotating shaft 35 is decreased so as to decrease the diameter thereof, it is possible to decrease moment of inertia of the rotating shaft 35, and it is possible to improve rotation efficiency of the rotating shaft 35.

Third Embodiment

Figure 5:
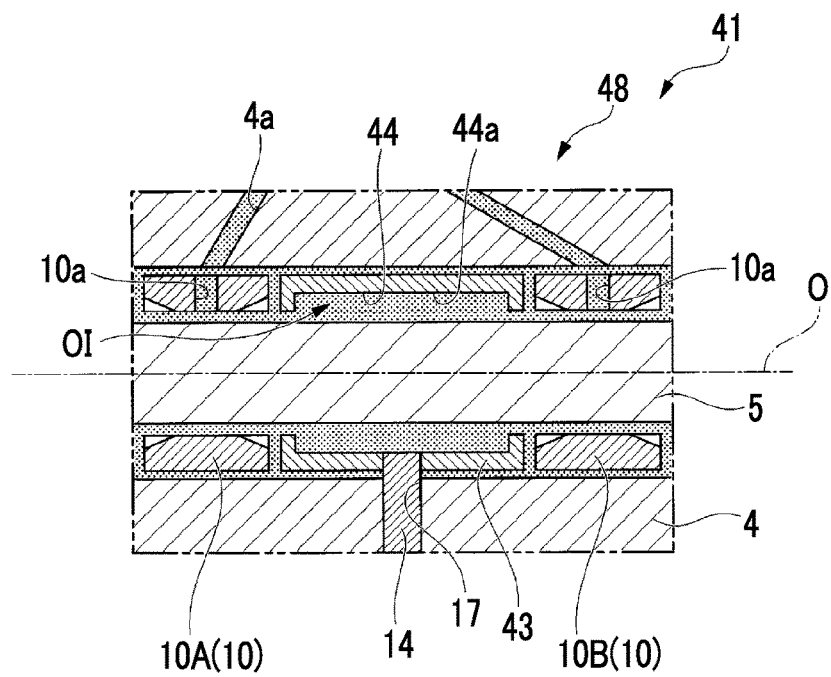
FIG. 5 is a sectional view including an axis of a bearing device in a turbocharger according to a third embodiment of the present invention.

Hereinafter, a turbocharger 41 (rotary machine) of a third embodiment of the present invention will be described with reference to FIG. 5.

The same reference numerals are assigned to the components similar to those of the first and second embodiments, and detailed descriptions thereof are omitted.

In the present embodiment, the shape of a stationary bush 43 in a bearing device 48 is different from those of the first and second embodiments.

In the stationary bush 43, a recessed portion 44 which is recessed from the inside in the radial direction toward the outside is annularly formed on the inner peripheral surface facing the outer peripheral surface of the rotating shaft 5 in the peripheral direction of the rotating shaft 5.

Accordingly, a distance between a bottom surface 44a (a surface facing the inside in the radial direction) of the recessed portion 44 and the outer peripheral surface of the rotating shaft 5 facing the bottom surface 44a is greater than a distance between the outer peripheral surface of the rotating shaft 5 and the inner peripheral surface of the rotation bush 10 facing the outer peripheral surface.

According to the turbocharger 41 of the present embodiment, a distance between the bottom surface 44a of the recessed portion 44 and the rotating shaft 5 in the radial direction is greater than a distance between the rotation bush 10 and the rotating shaft 5 in the radial direction. Accordingly, it is possible to decrease shearing stress of the lubricating oil OI flowing into a portion between the inner peripheral surface of the stationary bush 43 and the outer peripheral surface of the rotating shaft 5 facing the inner peripheral surface. As a result, it is possible to decrease a rotation loss of the bearing device 48.

Fourth Embodiment

Figure 6:
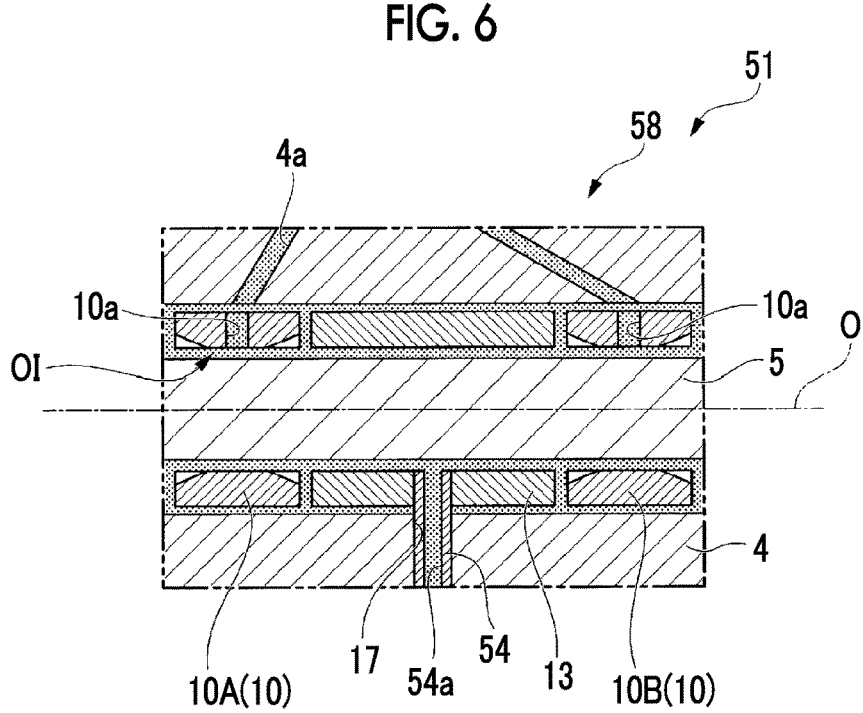
FIG. 6 is a sectional view including an axis of a bearing device in a turbocharger according to a fourth embodiment of the present invention.

Hereinafter, a turbocharger 51 (rotary machine) of a fourth embodiment of the present invention will be described with reference to FIG. 6.

The same reference numerals are assigned to the components similar to those of the first to third embodiments, and detailed descriptions thereof are omitted.

In the present embodiment, the shape of a stationary bush fixing portion 54 in a bearing device 58 is different from those of the first to third embodiments.

Similarly to the first embodiment, the stationary bush fixing portion 54 is a pin which is fitted into the hole portion 17 formed in the housing 4 and the stationary bush 13. However, in the present embodiment, a discharging hole 54a which penetrates in the radial direction and through which the lubricating oil OI is discharged to the outside of the stationary bush 13 and the housing 4 is formed in the pin. That is, the pin is formed in a hollow tubular shape.

The discharging hole 54a may be formed to extend downward when the turbocharger 51 is installed.

According to the turbocharger 51 of the present embodiment, the lubricating oil OI flowing into a portion between the outer peripheral surface of the rotating shaft surround by the stationary bush 13 and the inner peripheral surface of the stationary bush 13 is discharged to the outside in the radial direction through the discharging hole 54a.

As a result, it is possible to discharge the contaminated unnecessary lubricating oil OI to the outside of the bearing device 58, and it is possible to decrease an agitation loss or a friction loss when the rotating shaft 5 rotates.

In addition, since the discharging hole 54a is formed in the stationary bush fixing portion 54, it is possible to easily form the discharging hole 54a. Therefore, in a case where disadvantages such as clogging of the discharging hole 54a occur, inspection and replacement are easily performed by removing only the stationary bush fixing portion 54.

Fifth Embodiment

Figure 7:
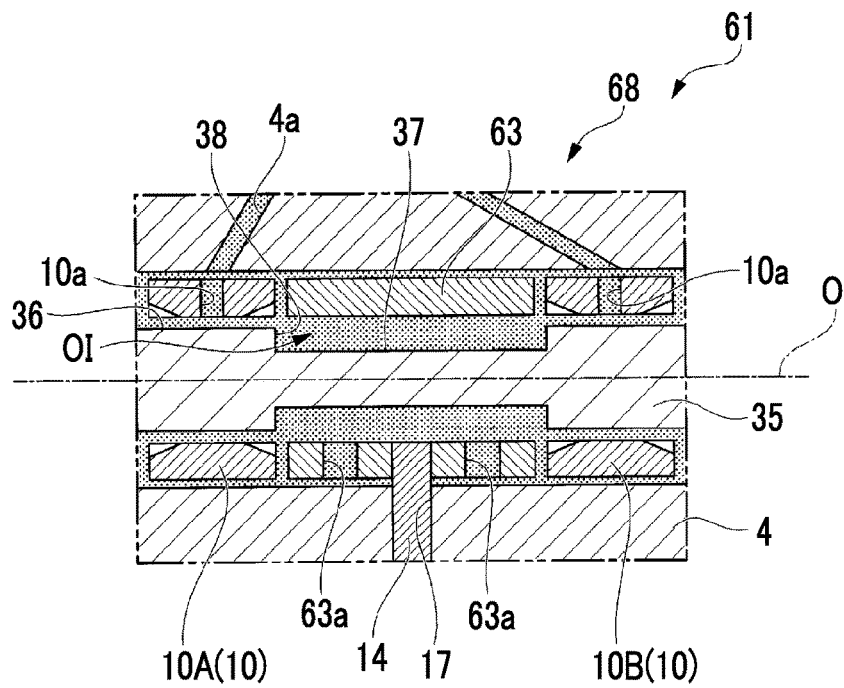
FIG. 7 is a sectional view including an axis of a bearing device in a turbocharger according to a fifth embodiment of the present invention.

Hereinafter, a turbocharger 61 (rotary machine) of a fifth embodiment of the present invention will be described with reference to FIG. 7.

The same reference numerals are assigned to the components similar to those of the fourth embodiment, and detailed descriptions thereof are omitted.

In the present embodiment, a stationary bush 63 in a bearing device 68 is different from those of the first to fourth embodiments. In addition, similarly to the second embodiment, in the present embodiment, the diameter of a portion of the rotating shaft 35 decreases.

Discharging holes 63a through which the lubricating oil OI is discharged are formed in the stationary bush 63 so as to penetrate in the radial direction. In the present embodiment, a pair of discharging holes 63a are formed such the stationary bush fixing portion 14 is interposed therebetween from both sides in the direction of the axis O.

In addition, the discharging holes 63a may be formed to extend downward when the turbocharger 61 is installed.

According to the turbocharger 61 of the present embodiment, the lubricating oil OI flowing into a portion between the outer peripheral surface of the rotating shaft surround by the stationary bush 63 and the inner peripheral surface of the stationary bush 63 is discharged to the outside in the radial direction through the discharging hole 63a. As a result, it is possible to decrease an agitation loss or a friction loss when the rotating shaft 35 rotates by discharging the contaminated unnecessary lubricating oil OI.

In the present embodiment, only the discharging holes 63a are formed in the stationary bush 63. However, like the fourth embodiment, the stationary bush fixing portion 54 in which the discharging hole 54a is formed may be used together.

Sixth Embodiment

Figure 8:
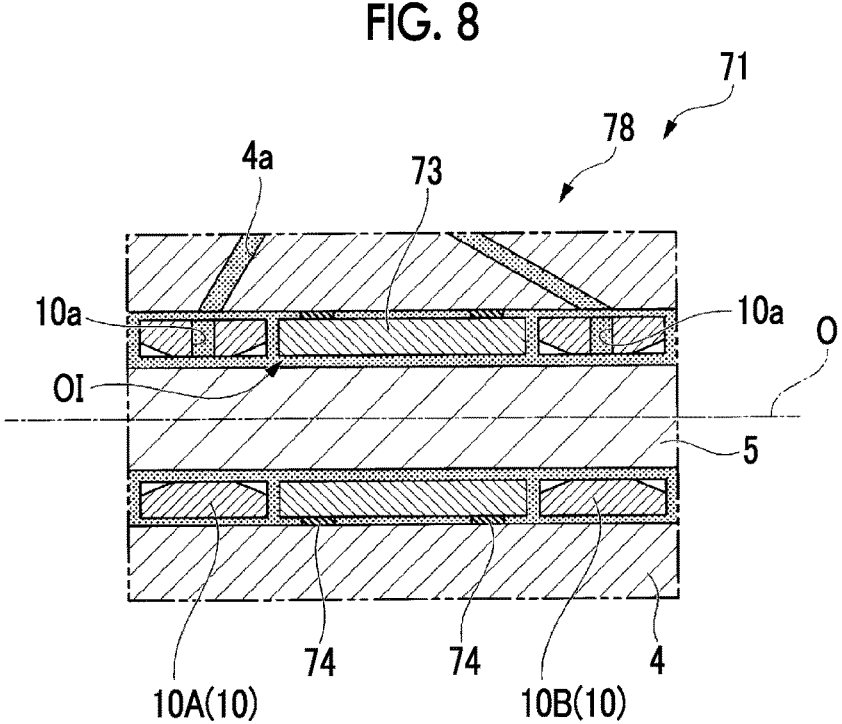
FIG. 8 is a sectional view including an axis of a bearing device in a turbocharger according to a sixth embodiment of the present invention.

Hereinafter, a turbocharger 71 (rotary machine) of a sixth embodiment of the present invention will be described with reference to FIG. 8.

The same reference numerals are assigned to the components similar to those of the first to fifth embodiments, and detailed descriptions thereof are omitted.

In the present embodiment, stationary bush fixing portions 74 in the bearing device 78 are different from those of the first to fifth embodiments.

Each of the stationary bush fixing portions 74 is a support member which is interposed between the housing 4 and the stationary bush 73 and allows the movement of the stationary bush 73 the radial direction while regulating the movement of the stationary bush 73 in the direction of the axis O.

In the present embodiment, the stationary bush fixing portion 74 is an elastic body which is formed of an elastically deformable material such as a resin, and is annularly formed about the axis O. In addition, since the stationary bush fixing portions 74 are disposed at positions of both end portions of the stationary bush 73 in the direction of the axis O, a pair of stationary bush fixing portions 74 are provided at a distance from each other in the direction of the axis O.

According to the turbocharger 71 of the embodiment, since the stationary bush fixing portion 74 is an elastic body, the stationary bush 73 follows vibrations of the rotating shaft 5, and it is possible to prevent the stationary bush 73 from coming into partial contact with the rotating shaft 5.

In addition, an operation which returns the rotating shaft 5 to the original position (an initial position in a state where the shaft vibrations are not applied) is performed due to an elastic force of the elastic body. Accordingly, it is possible to receive the radial load of the rotating shaft 5 by the oil film of the lubricating oil OI while the rotating shaft 5 is stably supported by the bearing device 78.

Here, for example, the stationary bush fixing portion 74 may be a spring member such as a plate spring or a coil spring. In addition, the stationary bush fixing portion 74 may be an elastically deformable metal, or a plate-shaped member or an annular member formed of a resin.

Hereinbefore, embodiments of the present invention are described in detail. However, some design modifications may be applied to the present invention within a scope which does not depart from a technical idea of the present invention.

The above-described embodiments may be combined. For example, the rotating shaft 35 of the second embodiment and the discharging hole 54a of the fourth embodiment may be used together.

In addition, the above-described embodiments, the example in which two rotation bushes are provided is described. However, only one rotation bush may be provided. In addition, three or more rotation bushes may be provided, and in this case, multiple stationary bushes may be provided at a distance from each other in the direction of the axis O.

INDUSTRIAL APPLICABILITY

According to the above-described bearing device and rotary machine, since the rotation bush receives the load of the rotating shaft from both directions such as the thrust direction and the radial direction, it is possible to decrease the bearing loss of the entire rotating shaft generated due to the rotation of the rotating shaft.

REFERENCE SIGNS LIST

1: turbocharger (rotary machine)
2: exhaust turbine
3: compressor
4: housing
4a: oil supply flow path
5: rotating shaft
8: bearing device
10: rotation bush
10A: first rotation bush
10B: second rotation bush
10a: oil supply hole
13: stationary bush
14: stationary bush fixing portion
15: sleeve
16: flange section
16A: first flange section
16B: second flange section
17: hole portion
18: journal pad surface
19: thrust pad surface
O: axis
OI: lubricating oil (fluid)
G: exhaust gas
AR: air
25: land surface
26 (26A, 26B): tapered surface
R: rotation direction
31: turbocharger (rotary machine)
35: rotating shaft
36: large-diameter outer peripheral surface
37: small-diameter outer peripheral surface
38: stepped surface
41: turbocharger (rotary machine)
43: stationary bush
44: recessed portion
44a: bottom surface
48: bearing device
51: turbocharger (rotary machine)
54: stationary bush fixing portion
54a: discharging hole
58: bearing device
61: turbocharger (rotary machine)
63: stationary bush
63a: discharging hole
68: bearing device
71: turbocharger (rotary machine)
73: stationary bush
74: stationary bush fixing portion
78: bearing device

The invention claimed is:

1. A bearing device, comprising:
a flange section which protrudes in a radial direction of a rotating shaft rotating about an axis and rotates along with the rotating shaft;
a stationary bush which is disposed at a distance in the direction of the axis from the flange section, surrounds an outer peripheral surface of the rotating shaft, and is provided in a housing supporting the rotating shaft so as to be immovable in the direction of the axis relative to the rotating shaft; and
a rotation bush which is disposed between the flange section and the stationary bush so as to be interposed between the flange section and the stationary bush in the direction of the axis, surrounds the outer peripheral surface of the rotating shaft, and is rotatable relative to the rotating shaft and the housing while floating in a fluid,
wherein the rotation bush includes a land surface which is formed on a surface in the direction of the axis facing each of the flange section and the stationary bush along a surface in the direction of the axis in the flange section and the stationary bush, and a tapered surface which is continuous with the land surface and is inclined such that a gap between the tapered surface and the flange section and a gap between the tapered surface and the stationary bush increase in the direction of the axis toward a direction opposite to a rotation direction of the rotating shaft, and
wherein a ratio of an area of the tapered surface to an area of the land surface on the stationary bush side is larger than that on the flange section side.

2. A rotary machine, comprising:
the bearing device according to claim 1; and
the rotating shaft which is supported by the bearing device.

3. The bearing device according to claim 1,
wherein a discharging hole through which the fluid is discharged is formed in the stationary bush to penetrate the stationary bush in the radial direction.

4. The bearing device according to claim 3,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

5. The bearing device according to claim 1,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

6. The bearing device according to claim 5,
wherein a diameter of a portion of the rotating shaft corresponding to a region in which the stationary bush is disposed in the direction of the axis decreases.

7. The bearing device according to claim 5,
wherein in the stationary bush, a recessed portion which is recessed from the inside in the radial direction toward the outside is formed on the inner peripheral surface facing the outer peripheral surface of the rotating shaft in the peripheral direction of the rotating shaft, and
wherein a distance between a bottom surface of the recessed portion and the outer peripheral surface of the rotating shaft facing the bottom surface is greater than a distance between the outer peripheral surface of the rotating shaft and the inner peripheral surface of the rotation bush facing the outer peripheral surface.

8. The bearing device according to claim 1,
wherein the stationary bush is a member which is separated from the housing, and
wherein a stationary bush fixing portion which fixes the stationary bush and the housing is further provided.

9. The bearing device according to claim 8,
wherein a discharging hole through which the fluid is discharged is formed in the stationary bush to penetrate the stationary bush in the radial direction.

10. The bearing device according to claim 8,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

11. A rotary machine, comprising:
the bearing device according to claim 8; and
the rotating shaft which is supported by the bearing device.

12. The bearing device according to claim 8,
wherein the stationary bush fixing portion is interposed between the housing and the stationary bush, regulates the movement of the stationary bush in the direction of the axis, and allows the movement of the stationary bush in the radial direction, and
wherein the stationary bush fixing portion is an elastic body.

13. The bearing device according to claim 12,
wherein a discharging hole through which the fluid is discharged is formed in the stationary bush to penetrate the stationary bush in the radial direction.

14. The bearing device according to claim 12,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

15. The bearing device according to claim 8,
wherein the stationary bush fixing portion is a pin which is fitted into a hole portion which penetrates the housing and the stationary bush.

16. The bearing device according to claim 15,
wherein a discharging hole through which the fluid is discharged is formed in the stationary bush to penetrate the stationary bush in the radial direction.

17. The bearing device according to claim 15,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

18. The bearing device according to claim 15,
wherein a discharging hole through which the fluid is discharged is formed in the stationary bush fixing portion to penetrate the stationary bush fixing portion in the radial direction.

19. The bearing device according to claim 18,
wherein a discharging hole through which the fluid is discharged is formed in the stationary bush to penetrate the stationary bush in the radial direction.

20. The bearing device according to claim 18,
wherein a distance between the outer peripheral surface of the rotating shaft and the inner peripheral surface of the stationary bush facing the outer peripheral surface in the radial direction is greater than a distance between the outer peripheral surface of the rotating shaft and the inner peripheral surface of the rotation bush facing the outer peripheral surface in the radial direction.

* * * * *